United States Patent
Pasternak

(10) Patent No.: US 9,465,587 B2
(45) Date of Patent: Oct. 11, 2016

(54) PRESERVING RESTFUL WEB SERVICE STRUCTURE IN A CLIENT CONSUMING THE RESTFUL WEB SERVICE

(71) Applicant: Red Hat Israel, Ltd., Raanana (IL)

(72) Inventor: Michael Pasternak, Raanana (IL)

(73) Assignee: Red Hat Israel, Ltd., Raanana (IL)

(*) Notice: Subject to any disclaimer, the term of this patent is extended or adjusted under 35 U.S.C. 154(b) by 138 days.

(21) Appl. No.: 13/690,466

(22) Filed: Nov. 30, 2012

(65) Prior Publication Data

US 2014/0157227 A1   Jun. 5, 2014

(51) Int. Cl.
*G06F 9/44* (2006.01)
*G06F 15/16* (2006.01)
*G06F 15/173* (2006.01)
*G06F 17/30* (2006.01)
*G06F 9/45* (2006.01)
*G06F 9/54* (2006.01)

(52) U.S. Cl.
CPC .......... *G06F 8/30* (2013.01); *G06F 17/30887* (2013.01); *G06F 8/40* (2013.01); *G06F 9/54* (2013.01)

(58) Field of Classification Search
CPC .............. G06F 8/10; G06F 8/20; G06F 8/70; G06F 9/44; G06F 9/547; G06F 9/465; G06F 17/30604; G06F 17/30887; G06F 17/30371; G06F 17/30404; G06F 8/30; G06F 8/65; G06F 8/75; G06F 21/621; G06F 17/30035; G06F 17/30864; G06F 9/54; G06F 9/4445; G06F 8/36
See application file for complete search history.

(56) References Cited

U.S. PATENT DOCUMENTS

| | | | |
|---|---|---|---|
| 2009/0106252 A1* | 4/2009 | Chopra | H04L 67/02 |
| 2009/0328205 A1* | 12/2009 | Ims | G06Q 10/10 726/22 |
| 2010/0145946 A1* | 6/2010 | Conrad | G06F 17/30887 707/736 |
| 2010/0199260 A1* | 8/2010 | Duggal | G06F 8/70 717/106 |
| 2012/0072541 A1* | 3/2012 | Carls | G06F 17/30887 709/219 |
| 2012/0180109 A1* | 7/2012 | Chen | G06F 17/30035 726/3 |
| 2012/0185567 A1* | 7/2012 | Ma | G06Q 50/10 709/217 |
| 2012/0254102 A1* | 10/2012 | Li | G06Q 10/10 706/58 |
| 2012/0254407 A1* | 10/2012 | Li | H04W 4/025 709/224 |

(Continued)

OTHER PUBLICATIONS

Marc Hadley et al., JAX-RS: Java API for RESTful Web Services, Sep. 8, 2008, [Retrieved on Aug. 25, 2015]. Retrieved from the internet: <URL: http://www.sws.bfh.ch/~fischli/courses/eadj/jws/doc/jaxrs-1.0-final-spec.pdf> 49 Pages (1-39).*

(Continued)

*Primary Examiner* — Thuy Dao
*Assistant Examiner* — Anibal Rivera
(74) *Attorney, Agent, or Firm* — Lowenstein Sandler LLP

(57) ABSTRACT

A computer system identifies a uniform resource identifier (URI) that corresponds to a resource of a RESTful web service. The URI contains elements. The computer system identifies a relationship between the elements of the URI and creates programming code for a method of a software development kit (SDK) client. The method reflects the relationships between the elements of the URI to facilitate communication with the resource of the RESTful web service.

18 Claims, 5 Drawing Sheets

(56) References Cited

U.S. PATENT DOCUMENTS

| | | | | |
|---|---|---|---|---|
| 2012/0296929 | A1* | 11/2012 | Hossain | G06F 17/30864 707/769 |
| 2012/0304275 | A1* | 11/2012 | Ji | H04L 63/0245 726/11 |
| 2013/0080268 | A1* | 3/2013 | Gordon | G06Q 30/02 705/14.73 |
| 2013/0086639 | A1* | 4/2013 | Sondhi | H04L 63/0815 726/4 |
| 2013/0133010 | A1* | 5/2013 | Chen | H04N 21/482 725/61 |
| 2013/0275957 | A1* | 10/2013 | Villar | G06F 9/4445 717/173 |
| 2014/0040863 | A1* | 2/2014 | Hale | G06F 8/36 717/123 |
| 2014/0053166 | A1* | 2/2014 | Moore | G06F 9/54 719/316 |

OTHER PUBLICATIONS

Nina Jeliazkova et al., AMBIT Restful web services: an implementation of the OpenTox application programming interface, 2011, [Retrieved on Feb. 26, 2016]. Retrieved from the internet: <URL: http://download.springer.com/static/pdf/432/art%253A10.1186%252F1758-2946-3-18.pdf?> 18 Pages (1-18).*

Steve Vinoski, RESTful Web Services Development Checklist, 2008 IEEE, [Retrieved on Feb. 26, 2016]. Retrieved from the internet: <URL: http://ieeexplore.ieee.org/stamp/stamp.jsp?tp=&arnumber=4670126> 3 Pages (1-3).*

* cited by examiner

201 `<link rel="add" href="/api/datacenters">` 203  205A  207A
        ...
        `<http_method>POST</http_method>`
        ...
        `</request>`
        `<response>`
        `<type>DataCenter</type>`
        `</response>`                                205B  207B
    `</link>`
211 `<link rel="get" href="/api/datacenters">`  205C
        ...
    `</link>`
213 `<link rel="add" href="/api/hosts">`  205D  221A
        ...
    `</link>`
215 `<link rel="get" href="/api/hosts">`  205E  221B
        ...
    `</link>`                                   225  227
217 `<link rel="add" href="/api/clusters/{cluster:id}/permissions">`  229  231
        ...
    `</link>`

PRESERVING RESTFUL WEB SERVICE STRUCTURE IN A CLIENT CONSUMING THE RESTFUL WEB SERVICE

TECHNICAL FIELD

The present disclosure relates to RESTful web services, and more particularly, to preserving RESTful web service structure in a client consuming the RESTful web service.

BACKGROUND

Web services are client and server applications that communicate over the World Wide Web's (WWW) Hypertext Transfer Protocol (HTTP). A web service is a software component provided through a network-accessible endpoint and can be called from other applications. For example, a financial company may have a web service that provides up to the minute stock quotes for customers who do their trading with that financial company. The information provided by the web service can be read from a web page and displayed, or read from a stand-alone application on a customer's desktop computer.

REpresentational State Transfer (REST) is a style of software architecture for distributed systems such as the World Wide Web. REST-style architectures include clients and servers. Clients can initiate requests to the servers, which can process the requests and return appropriate responses. In REST, requests and responses are built around the transfer of representations of resources. A representation of a resource is typically a document that captures the current or intended state of the resource. For example, the resource may be stock quotes.

A RESTful web service is a web service that is implemented using HTTP and the principals of REST. For example, a RESTful web service may be a customer data management web service and may have three resources: (1) a resource that is a list of all customers, (2) a resource that is data for a specific customer, and (3) a resource for adding a customer to the customer data. The RESTful resources can each have a uniform resource identifier (URI), which client applications can use to consume the resource.

A software developer may be familiar with a particular programming language, for example, Python or Java, but may not be familiar with HTTP, which the RESTful web service is based on. Typically, software developers spend an extensive amount of time to research, manual write, and adapt a HTTP-based layer to consume a HTTP-based RESTful web service. The software developer usually has to manually and continually maintain the HTTP-based layer, which can be a time consuming process.

BRIEF DESCRIPTION OF THE DRAWINGS

The present disclosure will be understood more fully from the detailed description given below and from the accompanying drawings of various implementations of the disclosure.

FIG. 2 illustrates an example of uniform resource identifiers for resources of a RESTful web service, in accordance with various implementations.

DETAILED DESCRIPTION

Figure 1:
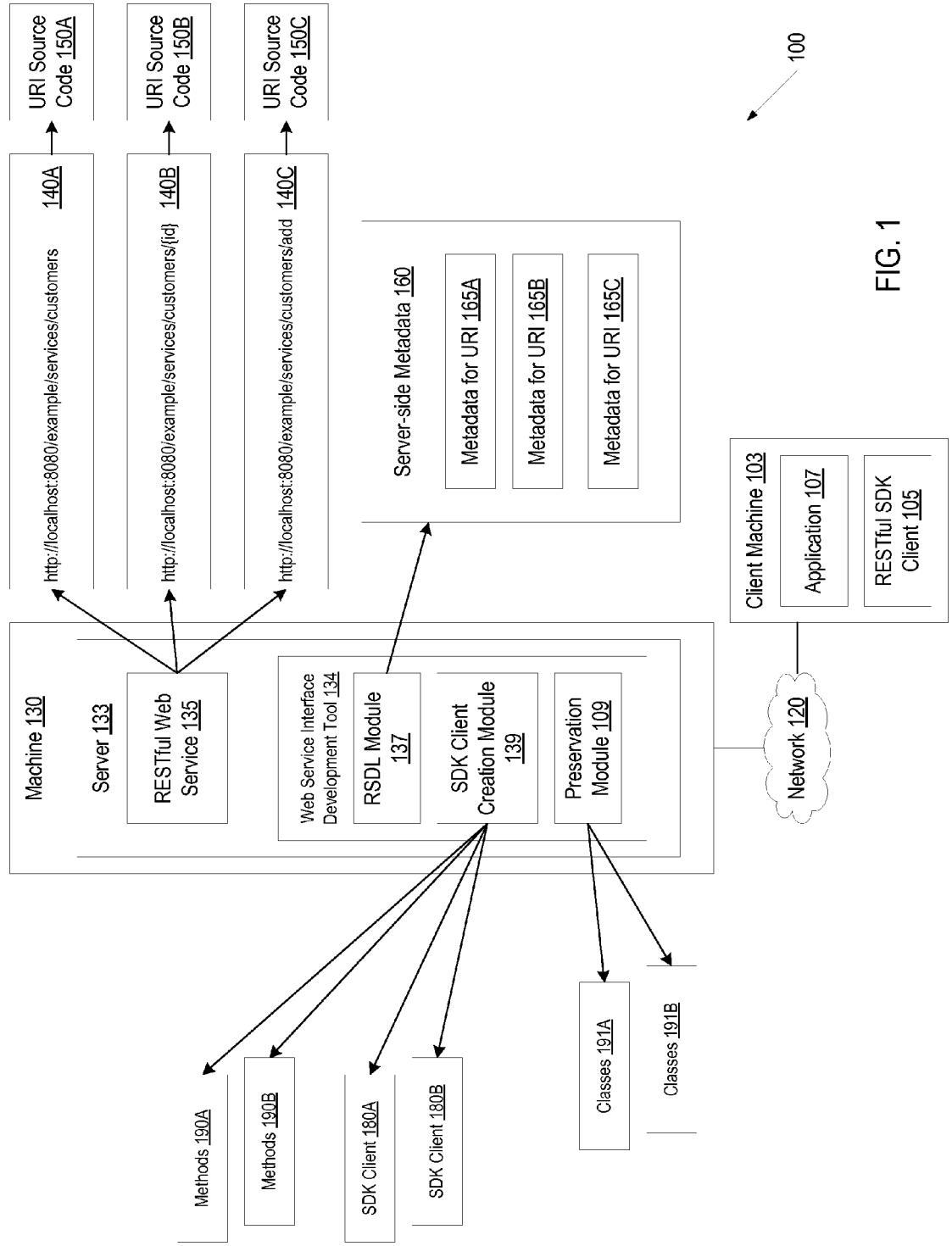
FIG. 1 illustrates an example system architecture, in accordance with various implementations.

Described herein are a method and apparatus for preserving the RESTful nature of the web service in a software development kit (SDK) client that is consuming the RESTful web service, according to various implementations. A RESTful web service is a web service that is implemented using HTTP (hypertext transfer protocol) and the principals of REST. A RESTful web service may include a URI for each resource. For example, there may be a virtual infrastructure management RESTful web service for managing virtual machines. The RESTful web service may have resources to get data for a particular virtual machine (VM) identifier (ID), delete a particular VM identifier, get the status of a particular VM identifier, etc. For example, the URI "http://localhost:8080/example/services/api/vms/12345" may be for getting the data for the virtual machine identifier 12345.

A SDK client is a tool to allow applications to consume resources of RESTful web services. Implementations keep resources logically related in the SDK client as the resources are defined on the server side to enable convenience on future development. Implementations provide a self description of the nature of the RESTful web service to the SDK client. Implementations can use RESTful service description language (RSDL) as a guide to propagate the relationships between the resources in the RESTful web service at the server to the SDK client.

An application can consume a RESTful web service resource. For example, an application may use the RESTful web service to get information for a virtual machine. The RESTful web service is HTTP-based and a user, such as a software developer, may not have familiarity with HTTP. The software development kit (SDK) client is a development tool that receives user input, for example, from a software developer, to allow the application to communicate with the RESTful web service via the RESTful SDK client. The SDK clients can be provided by the RESTful web service provider. The SDK clients can be provided for any number of programming languages (e.g., Python, Java, etc.). A software developer user, for example, can select a SDK client in a programming language that corresponds to the application. For example, if the application is a Python-based application, a Python SDK client for the RESTful web service can receive user input, for example, from a software developer, to configure the Python-based application to communicate with the RESTful web service.

Implementations describe a computer system that identifies a uniform resource identifier (URI) that corresponds to a resource of a RESTful (Representational State Transfer) web service. The URI contains a number of elements (e.g., strings, slash delimiters, etc.). For example, the URI may be "/api/datacenters/add" and the elements may include the slash delimiters "/" and the strings "api," "datacenters," and "add." The elements can indicate one or more relationships of the resource. For example, the elements "/api" may indicate a RESTful web service entry point of "api." An entry point is the root resource class into a RESTful web service. In another example, the elements "/datacenters" may indicate a collection of "datacenters" in the entry point "api." A collection is a container of resources. In another example, the elements "/add" may indicate and "add" resource for the RESTful web service is in the collection "datacenters."

Implementations can automatically identify the relationships between the elements that are defined in the URI and replicate the relationships in programming code for a RESTful web service SDK client that is to consume the resource. For example, implementations create programming code for a method of an SDK client. The method reflects the relationships between the elements of the URI to facilitate communication with the resource of the RESTful web service. Implementations also create programming code, for example, and not limited to, code for a class for the entry point of the RESTful web service, code for a class for the collection, code for a class for a sub-collection, and code for an instance of a resource. A class is a construct that can be used to create instances of the class. A method is a function, which is a block of organized, reusable code that can be used to perform a single related action. For example, an 'add' method in Python for a URI that uses a HTTP POST method can be created.

For example, the computer system creates programming code for an entry point class for a client application using a name of the entry point in the URI, creates programming code for a collection class for the collection using a name of the collection in the URI and adds a collection pointer that points to the collection class in the entry point class programming code. The computer system creates programming code for a method that corresponds to an operation in the URI for the resource. The computer system can create a method pointer based on the relationship in the URI. For example, the computer system may add a method pointer that points to the method in the collection class programming code. The computer system may iteratively continue to resources, sub-collections, sub-resources, etc. The entry point class programming code, the collection class programming code, the collection pointer, and the method pointer create the relationship that is defined in the URI in the SDK client.

In one implementation, the classes and methods are added as part of a SDK client. A SDK client can include, for example, the entry point class that corresponds to the URI, the collection class and/or sub-collection class that corresponds to the URI, a file describing the server-side methods for resources of the RESTful web service, a file containing sample code, a file containing documentation, etc. The SDK client can receive user input, for example, from a software developer, to allow an application that is written in a particular programming language to communicate with the RESTful web service. For example, a Python SDK client can call methods (e.g., Python methods, Java methods, etc.) on a server computer system.

FIG. 1 is an example system architecture 100 for various implementations. The system architecture 100 can include one or more machines 130 coupled to one or more client machines 103 via a network 120. The network 120 may be a public network, a private network, or a combination thereof. The machines 130 can include, and are not limited to, any data processing device, such as a desktop computer, a laptop computer, a mainframe computer, a personal digital assistant, a server computer, a handheld device or any other device configured to process data.

A machine 130 can include a server 133. The server 133 can include one or more RESTful web services 135. REpresentational State Transfer (REST) is an architecture style for accessing information on the web. In REST, information on the server-side is considered a resource, which developers can access in a uniform way using URIs and HTTP. A RESTful web service 135 can be defined based on input of an entity. An entity, as referred to herein, can represent any person, a business organization such as a corporation, an educational institution such as a college and university, etc. The RESTful web service 135 can have one or more resources, which can be accessed, for example by an application 107 hosted on a client machine 103 via a RESTful SDK client 105. The client machine 103 may be a computing device such as a server computer, a desktop computer, a set-top box, a gaming console, a television, a portable computing device such as, and not limited to, mobile telephones, personal digital assistants (PDAs), portable media players, netbooks, laptop computers, and the like.

For example, a RESTful web service 135 may be defined for the entity's customer data. The RESTful web service 135 may have a resource that is a list of all of the entity's customers, a resource that is data for a specific customer, a resource for adding a customer to the customer data, etc. The RESTful web service 135 can have URIs 140A-C that correspond to the resources of the RESTful web service 135. For example, URI 140A can be for the list of all of the entity's customers, URI 140B can be for data for a specific customer identifier (ID), and URI 140C can be used to add a customer.

An application 107 can use the URIs 140A-C via a RESTful SDK client 105 to consume the resources. For example, the application 107 can obtain a list of the entity's customers via the RESTful SDK client 105. The client machines 103 can host one or more applications 107. An application 107 can be any type of application including, for example, a web application, a desktop application, a browser application, etc.

The server 133 can include a web service interface development tool 134 for allowing applications 107 to consume resources of a RESTful web server 135 via a RESTful SDK client 105. In one implementation, the web service interface development tool 134 can include a RESTful service description language (RSDL) module 137, a SDK client creation module 139, and a preservation module 109. Note that in alternative implementations, the functionality of one or more of the modules may be combined or divided. The RSDL module 137 to describe the URIs (e.g., URIs 140A-C) for the RESTful web services 135 in a generic format. A generic format is a format that can be used by a number of different programming languages. The RSDL module 137 can publish a description of the URIs 140A-C as server-side metadata 160. The server-side metadata 160 can expose the structure of the URIs 140A-C for the RESTful web service 135 and can include metadata 165A-C for the corresponding URIs 140A-C. The server-side metadata 160 can be a RSDL file that describes the URIs 140A-C. The server-side metadata 160 can be an XML-formatted document that includes information about each URI 140A-C for the RESTful web service, including, for example, and not limited to, operations (e.g., add, delete, get, etc.) that can be called on the RESTful web service 135, input parameters that can be passed for the operations, return values from an operation, etc. In one implementation, the RSDL module 137 uses the source code 150A-C for the URIs 140A-C for the RESTful web service 135 to create the server-side metadata 160. The URI source code 150A-C can be stored in the server 133. In another implementation, the RSDL module 137 receives user input to create the server-side metadata 160 for the URIs 140A-C. The server-side metadata 160 can be stored in a data store that is coupled to the server 133.

The SDK client creation module 139 can automatically generate methods 190A-B for the URIs 140A-C without user interaction, in various programming languages. For example, the SDK client creation module 139 may automatically generate Python methods 190A that correspond to the URIs 140A-C and Java methods 190B that correspond to the URIs 140A-C. For example, if the server-side HTTP-based RESTful web service resource uses a POST HTTP method, the Java methods 190B may include a Java-based 'add' method for the resource, which a RESTful client 105 can call. The SDK client creation module 139 can automatically create SDK clients 180A-B without user interaction for various programming languages (e.g., Python, Java) based on the methods 190A-B. For example, SDK client 180A may be for Python and client SDK 180B may be for Java.

The preservation module 109 can replicate the relationships of the resources for the URIs 140A-C of the RESTful web service at the client machine 103. For example, the preservation module 109 can identify the relationships between elements in a URI, which can represent the relationships, for example, between an entry point for the RESTful web service, a collection for URI, a sub-collection for URI, an operation for the resource, and/or an instance of the resource. The preservation module 109 can identify the relationships from the URI and/or from a description (e.g., metadata 165A) for the URI (e.g., URI 140A). The preservation module 109 can create programming code for an entry point class, a collection class, a sub-collection class, and a method based on the relationship. The classes 161A-B (e.g., entry point class, a collection class, a sub-collection class) can be stored on a data store that is coupled to the server 133. For example, the preservation module 109 may add the method to the collection class by adding a method pointer that points to the method in the programming code for the collection class. In another example, the preservation module 109 may add the collection to the entry point class by adding a collection pointer that points to the collection in the programming code for the entry point class. The programming code for the entry point class, the collection, the sub-collection class, and the method can create the same relationship that is defined in description (e.g., metadata 165A) of the URI (e.g., URI 140A). In one implementation, the preservation module 109 uses the methods 190A-B that are created by the SDK client creation module 139. One implementation of creating programming code to replicate the relationships of the resource is described in greater detail below in conjunction with FIG. 4.

A RESTful web service client 105 can be defined using a software development kit (SDK) 180A-B that specializes in a particular language (e.g., Python, Java). A software development kit 180A-B may be a set of software development tools that allows for the creation of applications for a certain software framework, for example, to consume a RESTful web service. The SDK client 180A-B can be provided by the RESTful web service provider. A SDK client 180A-B, which can include the entry point classes, collection classes, and/or sub-collection classes for the resource of the RESTful web service, and data describing the server-side methods 190A-B that can be called for the RESTful web service may be installed on a client machine 103 (e.g., downloaded to the client machine by a user) as a RESTful SDK client 105. The installed RESTful SDK client 105. A RESTful SDK client 105 can be in a particular programming language and can allow an application 107, which may be written in the same programming language, to consume the RESTful web service. For example, the classes in the SDK client can be used to provide user access, for example, via a user interface (e.g., graphical user interface), to the collections in the entry point and to facilitate a selection of a collection. In another example, the classes in the SDK client can be used to provide user access, via the user interface, to the methods in the collection and to facilitate a selection of a method to call.

FIG. 2 illustrates an example of a portion of server-side metadata 200 describing URIs of a RESTful web service, in accordance with various implementations. The server-side metadata 200 can be part of a RSDL file for the RESTful web service. For example, the RESTful web service may be a virtual infrastructure management RESTful web service. The RESTful web service may include URIs for resources, such as, adding a datacenter to the infrastructure, providing a list of the datacenters in the infrastructure, adding a host to the infrastructure, providing a list of the hosts in the infrastructure, and adding an instance of a cluster. The server-side metadata 200 can include descriptions for the five URIs. The format of the server-side metadata 200 can include a list of URIs and a description for each URI. For example, there is a URI description 201 for the URI of the resource that adds a datacenter to the infrastructure, a URI description 211 for the URI of the resource that provides a list of the datacenters in the infrastructure, a URI description 213 for the URI of the resource that adds a host to the infrastructure, a URI description 215 for the URI of the resource that provides a list of the hosts in the infrastructure, and a URI description 217 for the URI of the resource that adds an instance of a cluster. Each of the URI descriptions 201,211,213,215,217 can include corresponding metadata that describes one or more operations (e.g., add, delete, get, etc.) that can be called on the RESTful web service, one or more input parameters that can be passed for the operations, return values from an operation, etc. For example, URI description 201 includes metadata 209.

Figure 3:
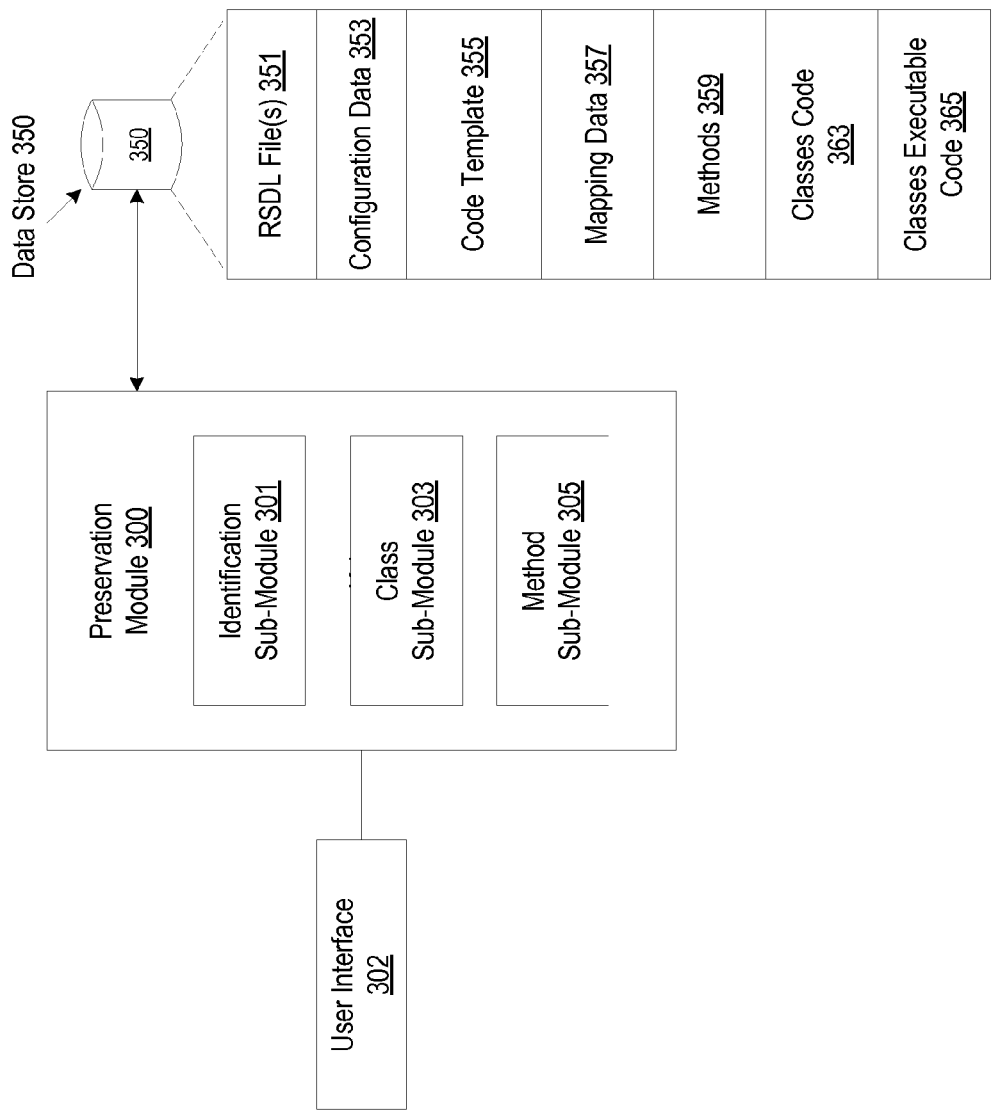
FIG. 3 is a block diagram of an implementation of a preservation module.

A preservation module (e.g, preservation module 109 in FIG. 1) can identify relationships between elements of a URI, which represent, for example, relationships between an entry point, a collection, a sub-collection, an operation, and a resource. The preservation module can identify relationships using the URIs and/or URI descriptions 201,211,213,215,217. A resource can include a sub-collection. For example, the URI description 217 indicates an entry point of "api" 205E, a collection of "clusters" 277, an operation "add" 225, a instance 229 of a cluster, and a sub-collection of "permissions" 231. The URI descriptions 201,211,213,215,217 can include the same entry point 205A-E. Some of the URI descriptions may include the same collections. For example, the URI descriptions 201,211 may include the same "datacenters" 207A-B collection, and the URI descriptions 213,215 may include the same "hosts" 221A-B collection FIG. 3 illustrates a block diagram of one implementation of a preservation module 300. The preservation module 300 may correspond to a preservation module 109 in a machine 130 of FIG. 1. The preservation module 300 can include an identification sub-module 301 and a method sub-module 303. Note that in alternative implementations, the functionality of one or more of the sub-modules can be combined or divided.

The identification sub-module 301 can identify a URI that correspond to a resource of a RESTful web service. In one implementation, the identification sub-module 301 identifies a RESTful service description language (RSDL) describing URIs for a RESTful web service. The RSDL for the RESTful web service can be a RSDL file 351 that is stored in a data store 350 that is coupled to the preservation module 300. The data store 350 can store a RSDL file 351 for any number of RESTful web services. The identification sub-module 31 can receive user input, via a user interface 302 that is coupled to the identification sub-module 301, identifying which RSDL file 351 to use. The user interface 302 can be a graphical user interface, a command line interface, etc.

The identification sub-module 301 can identify the URI descriptions in the RSDL file 351. For example, the identification sub-module 301 may identify five URI descriptions (e.g., URI descriptions 201,211,213,215,217 in FIG. 2) in a RSDL file 351 for a particular RESTful web service. The identification sub-module 301 can use configuration data 353 that is stored in the data store 350 to determine which search terms to use to identify the URI descriptions for the resources of the RESTful web service. For example, the configuration data 353 may specify the identification sub-module 301 is to search for "href" in the RSDL file 351.

The identification sub-module 301 can identify the relationships between elements in a URI, which can represent the relationships, for example, between an entry point for the RESTful web service, a collection for URI, a sub-collection for URI, an operation for the resource, and/or an instance of the resource. The identification sub-module 301 can identify an entry point for the RESTful web service in a URI description. The identification sub-module 301 can use the configuration data 353 to determine which search terms to use to locate the entry points in the URI descriptions. For example, the configuration data 353 may specify the identification sub-module 301 to search for "href" and a first slash delimiter "/" in the URI descriptions and to identify the string between the first slash delimiter "/" and a second slash delimiter "/" as a name of the entry point.

The identification sub-module 301 can identify a collection for the RESTful web service in a URI description. The identification sub-module 301 can use the configuration data 353 to determine which search terms to use to locate the collections in the URI descriptions. For example, the configuration data 353 may specify the identification sub-module 301 to search for "href" and a second slash delimiter "/" in the URI descriptions and to identify the string after the second slash delimiter "/" as a name of a collection.

The identification sub-module 301 can identify a sub-collection for the RESTful web service in a URI description. The identification sub-module 301 can use the configuration data 353 to determine which search terms to use to locate the sub-collections in the URI descriptions. For example, the configuration data 353 may specify the identification sub-module 301 to search for "href" and a third slash delimiter "/" in the URI descriptions and to identify any string, which does not represent an instance identifier (e.g., host instance identifier, cluster instance identifier, datacenter instance identifier, virtual machine instance identifier, etc.) to be a name of a sub-collection. For example, the URI description may be <"link href="/api/hosts/12235124/approve"rel="approve"> and "api" is the name of the entry point, "hosts" is the name of a collection, "12235124" is an identifier of an instance of a host and "approve" is a sub-collection.

The identification sub-module 301 can identify an operation for the resource in a URI description. The identification sub-module 301 can use the configuration data 353 to determine which search terms to use to locate the operation in the URI descriptions. For example, the configuration data 353 may specify the identification sub-module 301 to search for "rel=" in the URI descriptions and to identify the string after "rel=" as a name of the operation.

The class sub-module 303 can create a class for the entry point for the URI. The class sub-module 303 can create programming code for the entry point class. The class sub-module 303 can use a code template 355 that is stored in the data store 350 to create the programming code for the entry point class. The class sub-module 303 can use the name of the entry point as identified in the URI to create the entry point class programming code. The class sub-module 303 can store the entry point class programming code as part of the classes code 363 in the data store 350. The class sub-module 303 can add a collection pointer that points to the collection class in the entry point class programming code.

The class sub-module 303 can create executable code for the classes (e.g., entry point classes, collection classes, etc.) by compiling the classes code 363. The class sub-module 303 can store the executable code as classes executable code 365 in the data store 350.

The method sub-module 305 can create and/or locate methods for operation that has been identified in the URIs. In one implementation, the method sub-module 305 locates a method 359 that corresponds to the URI description in the data store 350. For example, another module (e.g., SDK client creation module 139 in FIG. 1) may have created a method 359 that corresponds to the URI description. In another implementation, the method sub-module 305 creates the method 359 for the URI operation. The method sub-module 303 can extract the identified metadata or a portion of the identified metadata from the RSDL file 351 and/or other files in the data store 350 to create a method for an operation in the URI description. For example, the operation in the URI description may be "get" and the method sub-module creates a "list" method for the "get" operation using the metadata for the URI description. The method sub-module 303 can use mapping data 357 that is stored in the data store 350 to determine which metadata to use to create the method. For example, the method sub-module 303 may extract a POST method from the RSDL file 351 and may use the mapping data 357 to determine that a POST method corresponds to an "add" method in Python. The method sub-module 305 can add a method pointer that points to the method in the collection class programming code.

The method sub-module 303 can store the created and/or located methods 359 for the URIs for the RESTful web service on a server. The server can be the server that is providing the RESTful web service. The method sub-module 303 can store one or more files for the methods 359 in a data store 350 that is coupled to the server. The server-side methods 359 can be called, for example, by RESTful web service SDK clients (e.g., RESTful SDK client 105 in FIG. 1) to consume the RESTful web service resource that corresponds to the method 359. The server may receive a call from a SDK client to execute one for the stored methods 359, execute the method 359, and return a value to the SDK client.

The data store 350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
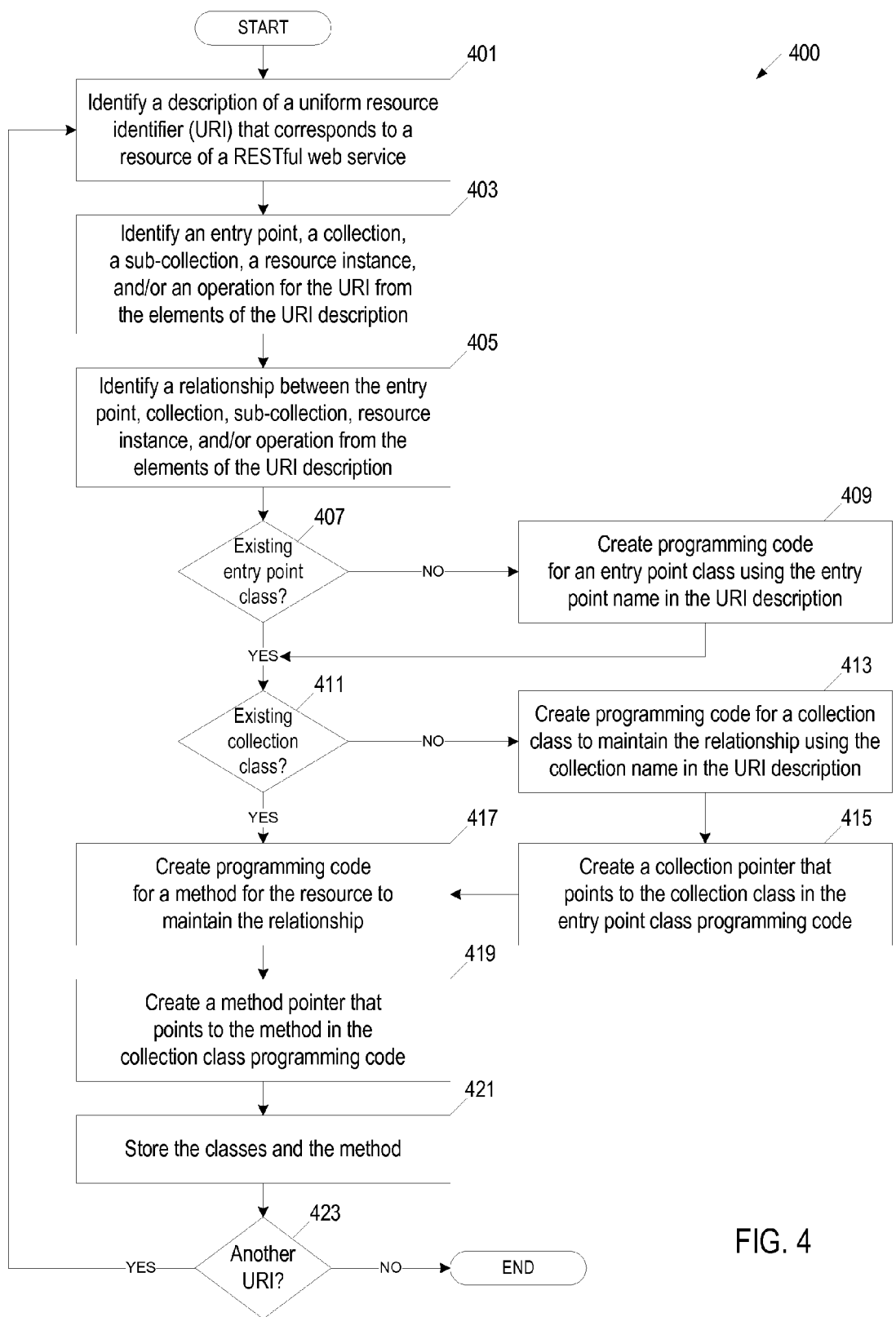
FIG. 4 is a flow diagram of an implementation of a method for preserving the RESTful nature of the web service in a software development kit (SDK) client that is consuming the RESTful web service.

FIG. 4 is a flow diagram of an implementation of a method 400 for preserving the RESTful nature of the web service in a software development kit (SDK) client that is consuming the RESTful web service. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a preservation module 109 in a server machine 130 of FIG. 1.

At block 401, processing logic identifies a URI that corresponds to a resource of a RESTful web service. Processing logic may identify the URI in a URI description. For example, processing logic can identify a RESTful service description language (RSDL) describing URIs for the RESTful web service. Processing logic can receive user input identifying the RSDL for the RESTful web service. For example, processing logic may receive user input of the location of a RSDL file. Processing logic can use configuration data to search for terms in the description. For example, processing logic may search for "href" in the RSDL file to identify the URI description of a resource. The URI contains elements (e.g., strings, slash delimiters, etc.) which can indicate a relationship between the elements. The relationship between the elements in the URI can represent the relationships between the entry point, the collection, sub-collection, resource instance, and/or operation for the resource.

At block 403, processing logic identifies an entry point, a collection, a sub-collection, a resource instance, and/or an operation for the URI from the elements (e.g., strings, slash delimiters, etc.) in the URI. Processing logic an identify the relationships between the elements of the URI. At block 405, processing logic identifies a relationship between the entry point, the collection, sub-collection, resource instance, and/or operation from the elements of the URI. For example, processing logic may determine that there is a sub-collection "permissions" in a collection "clusters" and that there is an "add" operation in the sub-collection "permissions."

At block 407, processing logic determines whether the entry point in the URI description matches an entry point in a previously identified URI description. URI descriptions may include the same entry point. Processing logic can search the entry point class programming code in a data store that is coupled to the preservation module to determine if an entry point class has the same name as the entry point in the URI description. If there is not an entry point class that has the same name, processing logic can create programming code for an entry point class using the entry point name in the URI description at block 409. For example, the entry point in the URI description is "api" and processing logic creates a class named "api."

At block 411, processing logic determines whether the collection in the URI description matches a collection in a previously identified URI description. URI descriptions may include the same collection. Processing logic can search the collection class programming code in the data store to determine if a collection class has the same name as the collection in the URI description. If there is not a collection class that has the same name, processing logic can create programming code for a collection class using the collection name in the URI description at block 413. For example, the collection in the URI description is "datacenters" and processing logic creates a class named "datacenters." At block 415, processing logic creates a collection pointer, which points to the collection class, in the programming code for the entry point class.

If processing logic identifies a sub-collection from the URI description, processing logic can also determine whether the sub-collection in the URI description matches a sub-collection in a previously identified URI description. URI descriptions may include the same sub-collection. Processing logic can search the sub-collection class programming code in the data store to determine if a sub-collection class has the same name as the sub-collection in the URI description. If there is not a sub-collection class that has the same name, processing logic can create programming code for a sub-collection class using the sub-collection name in the URI description at block 413. For example, the collection in the URI description is "permissions" and processing logic creates a class named "permissions." At block 415, processing logic creates a sub-collection pointer, which points to the sub-collection class, in the programming code for the collection class.

At block 417, processing logic creates a method of an SDK client. The method reflects the relationships between the elements of the URI to facilitate communication with the resource of the RESTful web service. The method corresponds to an operation in the URI for the resource. In one implementation, processing creates a method by locating a method that may have already been created for the resource, for example, by a SDK client creation module (e.g., SDK client creation module 139 in FIG. 1). In another implementation, processing logic uses metadata that corresponds to the URI description in the RSDL file to create the method. Processing logic can also use a template to create the method. At block 419, processing logic creates a method pointer, which points to the method, based on the relationship of the operation in the URI that corresponds to the method. For example, the method may be in the collection and processing logic creates a method pointer in the programming code for the collection class. In another example, the method may be in a sub-collection and processing logic creates a method pointer in the programming code for the sub-collection class.

At block 421, processing logic stores the classes (e.g., entry point class, collection class, sub-collection class) and the methods for the RESTful web service as part of a SDK client, according to one implementation. For example, processing logic may store the classes, methods, and/or data describing the methods as part of a SDK client, which may be downloaded to a client machine. In another implementation, processing logicstores the classes (e.g., entry point class, collection class, sub-collection class) and the methods for the RESTful web service on a server. The server can be the server that is providing the RESTful web service. Processing logic can store one or more files for the methods in a data store that is coupled to the server. The server may receive a call from a SDK client to execute one for the methods, execute the method, and return a value to the SDK client.

At block 423, processing logic determines whether there is another URI description in the RSDL. If there is another URI description, processing logic can return to block 401 to identify the URI description.

Figure 5:
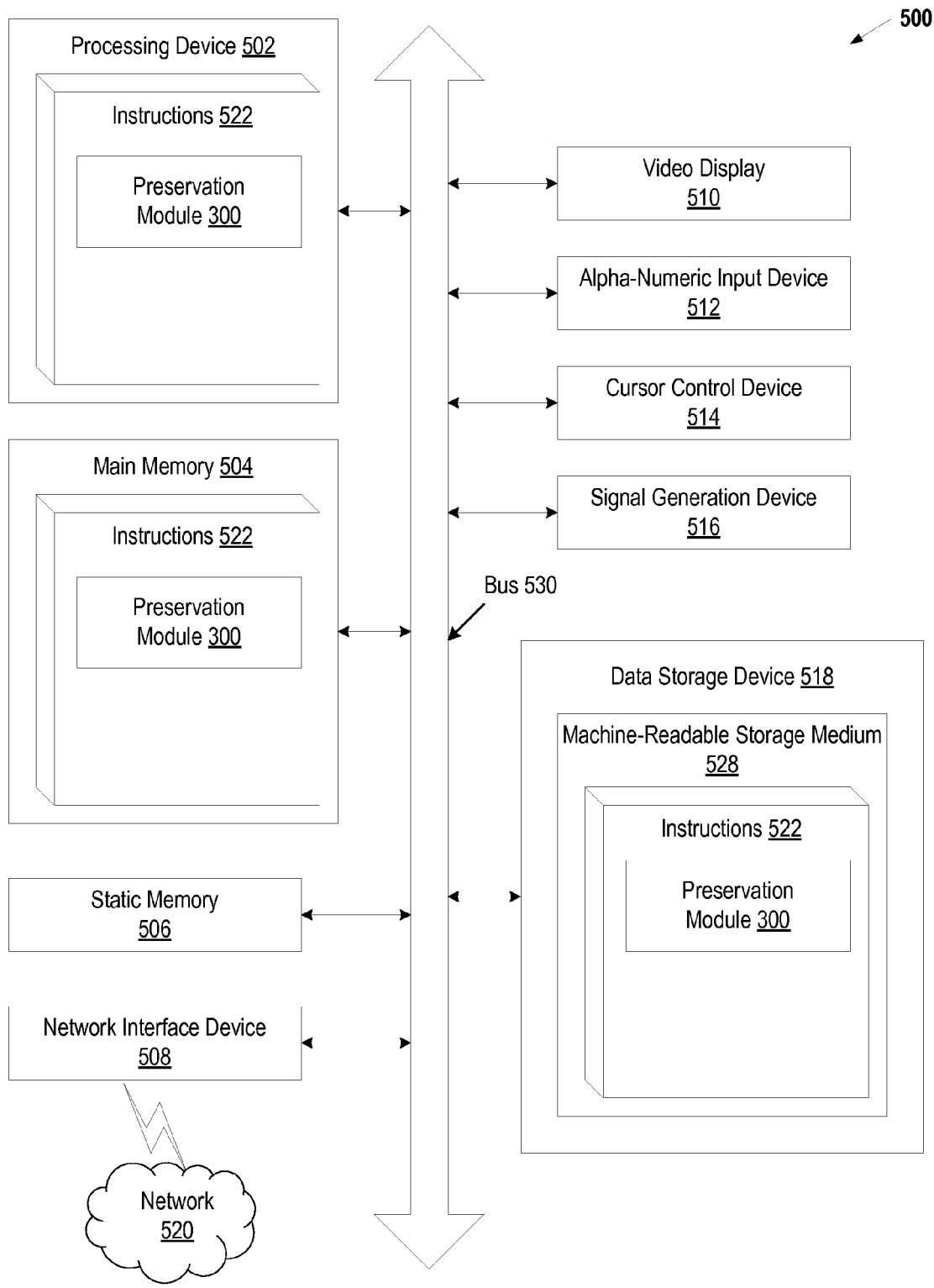
FIG. 5 is a block diagram of an example computer system that may perform one or more of the operations described herein.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a preservation module (e.g., preservation module 300 of FIG. 3) and/or a software library containing methods that call modules in a preservation module. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as or "identifying" or "creating" or "sending" or "adding" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A processor-executed method comprising:
   identifying a uniform resource identifier (URI) that corresponds to a resource of a RESTful (Representational State Transfer) web service provided by a server, the URI comprising a plurality of elements;
   identifying relationships between the plurality of elements of the URI;
   determining an entry point of the RESTful web service from the relationships between the plurality of elements, the entry point being a root resource class into the RESTFUL web service;
   determining a name of the entry point in the URI from the relationships of the plurality of elements in the URI;
   creating programming code for a method of a software development kit (SDK) client by creating programming code for an entry point class using the name of the entry point in the URI; and
   replicating, by a processing device, the relationships between the plurality of elements of the URI in the programming code for the method of the SDK client, the programming code comprising programming code corresponding to the entry point.

2. The method of claim 1, wherein identifying relationships between the plurality of elements of the URI comprises:
   determining a collection of the RESTful web service from the relationships between the plurality of elements of the URI.

3. The method of claim 2, wherein creating programming code for the method comprises:
   creating programming code for a collection class for the collection using a name of the collection in the URI;
   adding a collection pointer, that points to the collection class, in the entry point class programming code; and
   adding a method pointer, that points to the method, in the collection class programming code, wherein the entry point class programming code, the collection class programming code, the collection pointer, and the method pointer create a relationship that is identified in the URI.

4. The method of claim 3, further comprising:
   adding the entry point class programming code and the collection class programming code to the software development kit client.

5. The method of claim 1, wherein identifying the URI comprises:
   identifying a URI description for the URI in RESTful service descriptive language (RSDL) for the RESTful web service.

6. The method of claim 1, further comprising:
   identifying a second URI that corresponds to a second resource of the RESTful web service, the second URI comprising a second plurality of elements;
   identifying relationships between the second plurality of elements of the second URI; and
   replicating the relationships between the second plurality of elements of the second URI in programming code for a second method of the SDK client to facilitate communication with the second resource of the RESTful web service.

7. A non-transitory computer-readable storage medium including instructions that, when executed by a processing device, cause the processing device to:
   identify a uniform resource identifier (URI) that corresponds to a resource of a RESTful (Representational State Transfer) web service provided by a server, the URI comprising a plurality of elements;
   identify relationships between the plurality of elements of the URI;
   determine an entry point of the RESTful web service from the relationships between the plurality of elements, the entry point being a root resource class into the RESTFUL web service;
   determine a name of the entry point in the URI from the relationships of the plurality of elements in the URI;
   create programming code for a method of a software development kit (SDK) client by creating programming code for an entry point class using the name of the entry point in the URI; and
   replicate, by the processing device, the relationships between the plurality of elements of the URI in the programming code for the method of the SDK client, the programming code comprising programming code corresponding to the entry point.

8. The non-transitory computer-readable storage medium of claim 7, wherein to identify relationships between the plurality of elements of the URI comprises the processing device to:
   determine a collection of the RESTful web service from the relationships between the plurality of elements of the URI.

9. The non-transitory computer-readable storage medium of claim 8, wherein to create programming code for the method comprises the processing device to:
   create programming code for a collection class for the collection using a name of the collection in the URI;
   add a collection pointer, that points to the collection class, in the entry point class programming code; and
   add a method pointer, that points to the method, in the collection class programming code, wherein the entry point class programming code, the collection class programming code, the collection pointer, and the method pointer create a relationship that is identified in the URI.

10. The non-transitory computer-readable storage medium of claim 9, wherein the processing device is further to:
    add the entry point class programming code and the collection class programming code to the software development kit client.

11. The non-transitory computer-readable storage medium of claim 7, wherein to identify the URI comprises the processing device to:
    identify a URI description for the URI in RESTful service descriptive language (RSDL) for the RESTful web service.

12. The non-transitory computer-readable storage medium of claim 7, wherein the processing device is further to:
    identify a second URI that corresponds to a second resource of the RESTful web service, the second URI comprising a second plurality of elements;
    identify relationships between the second plurality of elements of the second URI; and replicate the relationships between the second plurality of elements of the second URI in programming code for a second method of the SDK client to facilitate communication with the second resource of the RESTful web service.

13. A system comprising:
a memory; and
a processing device operatively coupled to the memory to:
identify a uniform resource identifier (URI) that corresponds to a resource of a RESTful (Representational State Transfer) web service provided by a server, the URI comprising a plurality of elements;
identify relationships between the plurality of elements of the URI;
determine an entry point of the RESTful web service from the relationships between the plurality of elements, the entry point being a root resource class into the RESTFUL web service;
determine a name of the entry point in the URI from the relationships of the plurality of elements in the URI;
create programming code for a method of a software development kit (SDK) client by creating programming code for an entry point class using the name of the entry point in the URI; and
replicate the relationships between the plurality of elements of the URI in the programming code for the method of the SDK client, the programming code comprising programming code corresponding to the entry point.

14. The system of claim 13, wherein to identify relationships between the plurality of elements of the URI comprises the processing device to:
determine a collection of the RESTful web service from the relationships between the plurality of elements of the URI.

15. The system of claim 14, wherein to create programming code for the method comprises the processing device to:
create programming code for a collection class for the collection using a name of the collection in the URI;
add a collection pointer, that points to the collection class, in the entry point class programming code; and
add a method pointer, that points to the method, in the collection class programming code, wherein the entry point class programming code, the collection class programming code, the collection pointer, and the method pointer create a relationship that is identified in the URI.

16. The system of claim 15, wherein the processing device is further to:
add the entry point class programming code and the collection class programming code to the software development kit client.

17. The system of claim 13, wherein to identify the URI comprises the processing device to:
identify a URI description for the URI in RESTful service descriptive language (RSDL) for the RESTful web service.

18. The system of claim 13, wherein the processing device is further to:
identify a second URI that corresponds to a second resource of the RESTful web service, the second URI comprising a second plurality of elements;
identify relationships between the second plurality of elements of the second URI; and
replicate the relationships between the second plurality of elements of the second URI in programming code for a second method of the SDK client to facilitate communication with the second resource of the RESTful web service.

* * * * *